UNITED STATES PATENT OFFICE.

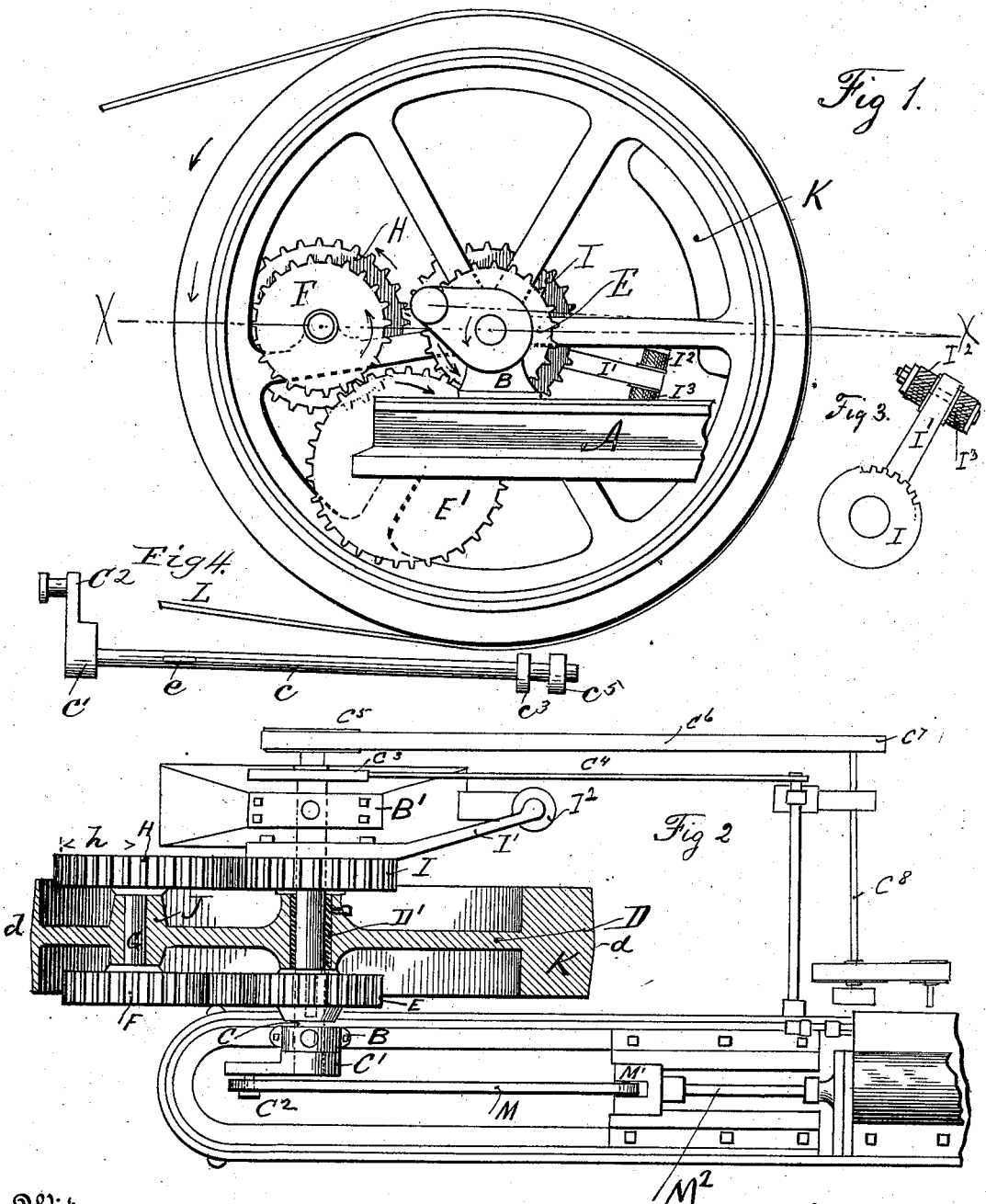

BENJAMIN CHARLES POLE, OF CAMDEN, NEW JERSEY.

DIFFERENTIAL FLY-WHEEL.

SPECIFICATION forming part of Letters Patent No. 577,065, dated February 16, 1897.

Application filed March 1, 1892. Serial No. 423,379. (No model.)

*To all whom it may concern:*

Be it known that I, BENJAMIN CHARLES POLE, a citizen of the United States, residing at Camden, in the county of Camden and State of New Jersey, have invented certain new and useful Improvements in Differential Fly-Wheels; and I do hereby declare the following to be a full, clear, and exact description of the invention, such as will enable others skilled in the art to which it appertains to make and use the same.

This invention relates to differential fly-wheels; and it consists in certain improvements in the construction of the same, as hereinafter described and claimed.

In the accompanying drawings, Figure 1 represents a side elevation of a differential fly-wheel provided with my improvements, a part of the frame or bed of an engine being also shown. Fig. 2 is a sectional plan view of the improved fly-wheel and other details. Fig. 3 illustrates a stationary gear, being the non-revoluble wheel and retaining-arm. Fig. 4 is a plan of the single sustaining rotative shaft.

A designates the bed-plate of an engine, and B and B' indicate pillow-blocks, in which is journaled a shaft C, on which is mounted a differential fly-wheel D. Keyed to the shaft C is a gear-wheel E, which engages with an idle-wheel E', which is mounted on a shaft having bearing in and carried by the fly-wheel D. The wheel E' connects with another gear-wheel F on one end of a shaft G, which is also mounted in and carried by the fly-wheel D.

H indicates a gear-wheel mounted on the opposite end of the shaft G in position to connect with a non-revoluble wheel I, which is held from rotating by an arm I' and springs $I^2 I^3$, forming an elastic retaining connection.

To counterbalance the weight of the wheel H, shaft G, and wheels F and E', a counterweight K is provided, which may be cast solid with the fly-wheel or be formed of a separate piece and secured thereto. The periphery of the fly-wheel is formed somewhat conical or angular in section, as seen at $d$, for the purpose of transmitting power by the belt L and to keep the belt in proper position on the wheel.

The shaft C is provided with a crank-arm C' for connection by a crank-pin $C^2$ with a connecting-rod M, which is connected to the cross-head M' and piston-rod $M^2$. On the other end of said shaft C is mounted an eccentric $C^3$, and rod $C^4$ being connected therewith to operate the slide-valve of the engine, or a rotary governor may be employed here to govern an automatic cut-off for the engine. When a belt is used with a governor, the shaft C is provided with a pulley $C^5$, which is connected by the endless belt $C^6$ with a pulley $C^7$ on the governor-rod $C^8$ of the engine.

The gear-wheels carried by the fly-wheel may be constructed of wood, rawhide, vulcanized fiber, or other suitable material, and may be arranged so as to be immersed in oil and operate therein for the purpose of preventing the action of dirt. The casing would have to be suitably counterbalanced and the entire action rendered as noiseless as possible.

On the shaft C is a sleeve D', which is connected with the fly-wheel D, so that the wear of the sleeve on said shaft may at all times be provided for.

The purpose of my invention is to change the ordinary operation of the transmission of power from the main shaft, so that said shaft may be rotated by means of a device located at some distance from said shaft and acting on the lever principle, or substantially to cause the rotation of the shaft by means of a lever extending therefrom to a point equidistant with the outermost point $h$ in the pitch-line of the wheel H.

The operation of the machine is as follows: Power being applied to the main shaft C the wheel E on said shaft is rotated, and said wheel E, through the idle-wheel E', imparts rotary motion to gear-wheel F. The wheel F, through the shaft G, imparts rotary motion to gear-wheel H, which connects with the stationary gear-wheel I, whereby the fly-wheel is rotated. The cushions $I^2$ and $I^3$ are placed one above and the other below the arm I', thus forming an elastic retaining-stop for the non-revoluble wheel I.

I claim—

1. The combination, with an engine-motor, of a single sustaining rotative central shaft and single gear-wheel keyed thereto, a fly-wheel, loosely mounted on said shaft, a stationary, non-revoluble wheel and a series of gear-wheels on shafts carried by said fly-wheel and forming connection between said shafts and said non-revoluble wheel, substantially as and for the purposes described.

2. The combination with a single sustaining central rotative shaft, of a fly-wheel loosely mounted thereon, a gear-wheel fast on said shaft, an idle-wheel on a shaft carried by the said fly-wheel, two gear-wheels, one of which is on each end of a shaft carried by said fly-wheel, and a stationary, non-revoluble gear-wheel, in position to engage one of said two gear-wheels, the latter forming connection between the said non-revoluble wheel and the said idle-wheel which engages with the gear-wheel on the shaft of the fly-wheel, substantially as set forth and described.

3. The combination with a rotative shaft, of a fly-wheel loosely mounted thereon, a stationary non-revoluble wheel, a series of gear-wheels on shafts carried by said fly-wheel and forming connection between said non-revoluble wheel and the shaft of said fly-wheel, the latter being provided with a raised line or annular ridge on its periphery, adapted to retain belting in position thereon, substantially as set forth and described.

4. The combination with a rotative shaft and a fly-wheel loosely mounted thereon, of a non-revoluble gear-wheel having an elastic connection with a fixed base, said elastic connection consisting of an arm and springs, and a series of gear-wheels forming connection between said rotative shaft and said non-revoluble gear-wheel, substantially as and for the purposes described.

In testimony whereof I affix my signature in presence of two witnesses.

BENJAMIN CHARLES POLE.

Witnesses:
A. H. RAGAN,
THOMAS C. POLE.